United States Patent
Boyko et al.

(10) Patent No.: US 10,384,665 B1
(45) Date of Patent: Aug. 20, 2019

(54) METHODS AND SYSTEM FOR STARTING AN ENGINE

(71) Applicant: Ford Global Technologies, LLC, Dearborn, MI (US)

(72) Inventors: Anthony Boyko, Dearborn Heights, MI (US); Stephen Powell, Troy, MI (US); Seth Loveall, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/922,731

(22) Filed: Mar. 15, 2018

(51) Int. Cl.
| | | |
|---|---|---|
| *B60W 10/02* | (2006.01) | |
| *B60K 6/387* | (2007.10) | |
| *B60W 30/184* | (2012.01) | |
| *B60W 30/192* | (2012.01) | |
| *F02N 11/04* | (2006.01) | |
| *F02N 11/08* | (2006.01) | |
| *F02N 11/10* | (2006.01) | |
| *B60K 6/26* | (2007.10) | |

(52) U.S. Cl.
CPC ............ *B60W 10/02* (2013.01); *B60K 6/387* (2013.01); *B60W 30/184* (2013.01); *B60W 30/192* (2013.01); *F02N 11/04* (2013.01); *F02N 11/0851* (2013.01); *F02N 11/108* (2013.01); *B60K 2006/268* (2013.01); *B60W 2510/02* (2013.01); *B60W 2710/021* (2013.01); *F02N 2200/14* (2013.01); *F02N 2250/00* (2013.01); *F02N 2300/102* (2013.01)

(58) Field of Classification Search
CPC .. B60W 10/20; B60W 30/184; B60W 30/192; B60W 2510/02; B60W 2710/021; B60W 10/02; B60K 6/387; B60K 2006/268; B60K 6/297; F02N 11/04; F02N 11/0851; F02N 11/108; F02N 2200/14; F02N 2250/00; F02N 2300/102
USPC ................................................... 180/65.285
See application file for complete search history.

(56) References Cited

U.S. PATENT DOCUMENTS

| | | | |
|---|---|---|---|
| 8,689,757 B2 | 4/2014 | Lee et al. | |
| 9,108,633 B1* | 8/2015 | Atluri | B60W 20/10 |
| 9,731,703 B2* | 8/2017 | Message | B60W 10/08 |
| 2014/0102253 A1 | 4/2014 | Benz et al. | |
| 2016/0116031 A1* | 4/2016 | Koh | F16H 7/0827 |
| | | | 701/22 |
| 2017/0066431 A1* | 3/2017 | Kim | B60W 20/13 |

* cited by examiner

*Primary Examiner* — John D Walters
(74) *Attorney, Agent, or Firm* — David Kelley; McCoy Russell LLP (57) ABSTRACT

Systems and methods for operating a hybrid powertrain or driveline that includes an engine and an integrated starter/generator are described. In one example, a clutch is positioned between the engine and the integrated starter/generator to reduce the possibility of the integrated starter/generator exceeding a rated speed of the integrated starter/generator.

20 Claims, 5 Drawing Sheets

METHODS AND SYSTEM FOR STARTING AN ENGINE

FIELD

The present description relates to methods and a system for operating a powertrain of a hybrid vehicle. The methods and systems may be particularly useful for hybrid vehicles that include a belt driven integrated starter/generator.

BACKGROUND AND SUMMARY

A hybrid powertrain or driveline may include a belt integrated starter/generator (BISG) to charge a battery of a vehicle, provide propulsion power to the vehicle, and to start an engine of the vehicle. The BISG may have a rated positive output torque (e.g., a maximum torque provided by the BISG to propel the vehicle) and a rated negative output torque (e.g., a maximum torque absorbed by the BISG from the powertrain or driveline to slow the vehicle and/or to charge an electric energy storage device). The BISG may also have a rated speed (e.g., a maximum or threshold rotational speed of the BISG that is not to be exceeded). If the BISG is matched with a large displacement engine, the BISG may not have sufficient output torque to rotate the engine at cranking speed (e.g., 250 RPM) during engine starting. Nevertheless, pulleys with a ratio other than 1:1 may be placed between the BISG and the engine to provide mechanical advantage to the BISG so that the BISG may rotate the engine at cranking speed. However, the pulley ratio may cause BISG speed to be significantly greater than engine speed such that BISG speed may exceed rated BISG speed if the engine is operated at higher speeds. Therefore, it may be desirable to provide a way of cranking an engine via a BISG without exceeding a rated speed of the BISG at higher engine speeds.

The inventors herein have recognized the above-mentioned issues and have developed a powertrain operating method, comprising: closing a BISG control clutch in response to a BISG torque not being equal to zero and BISG speed less than the threshold speed via the controller; and opening the BISG control clutch in response to the BISG torque being equal to zero or BISG speed being greater than the threshold speed via the controller.

By closing a BISG control clutch in response to a BISG torque not being equal to zero and BISG speed less than a threshold speed, it may be possible to crank the engine, provide propulsion torque to a powertrain via the BISG, and charge a battery via the BISG at BISG speeds that are less than the threshold speed (e.g., the rated speed of the BISG). Further, by opening the BISG control clutch in response to BISG output torque being equal to zero or BISG speed being greater than the threshold speed, it may be possible to operate an engine at high speeds without exceeding a rated speed of the BISG. Further, by opening the BISG control clutch when BISG output torque is zero, the BISG may freewheel without having to follow engine speed so that the possibility of BISG degradation may be reduced.

The present description may provide several advantages. In particular, the approach may allow smaller BISGs to crank large displacement engines without exceeding rated speed of the BISG. Further, the approach may reduce BISG degradation. Further still, the approach may improve vehicle operation during conditions where a BISG control clutch is degraded.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
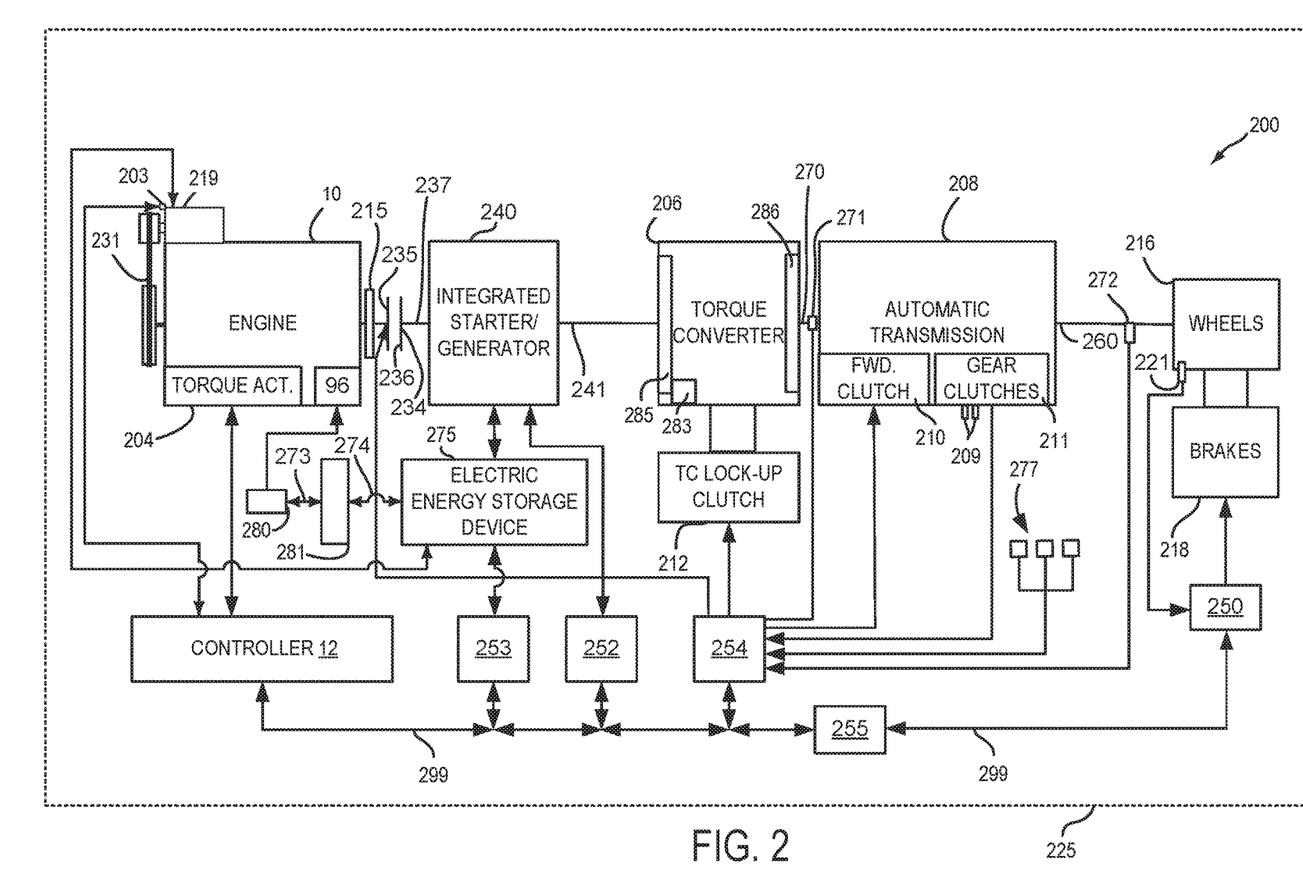
FIG. 2 is a schematic diagram of a hybrid vehicle driveline.
Figure 3A:
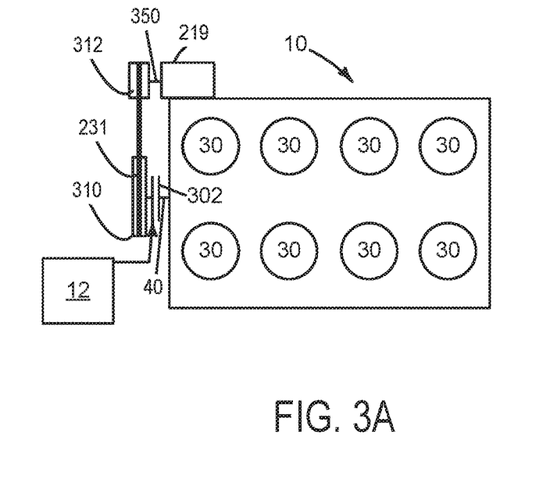
FIGS. 3A and 3B show example BISG control clutch configurations.
Figure 3B:
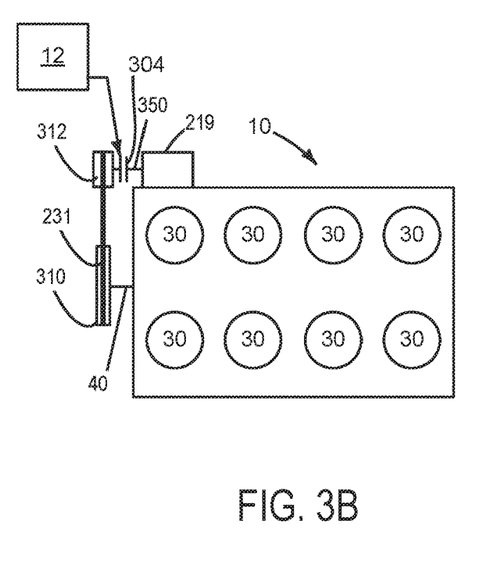
Figure 4:
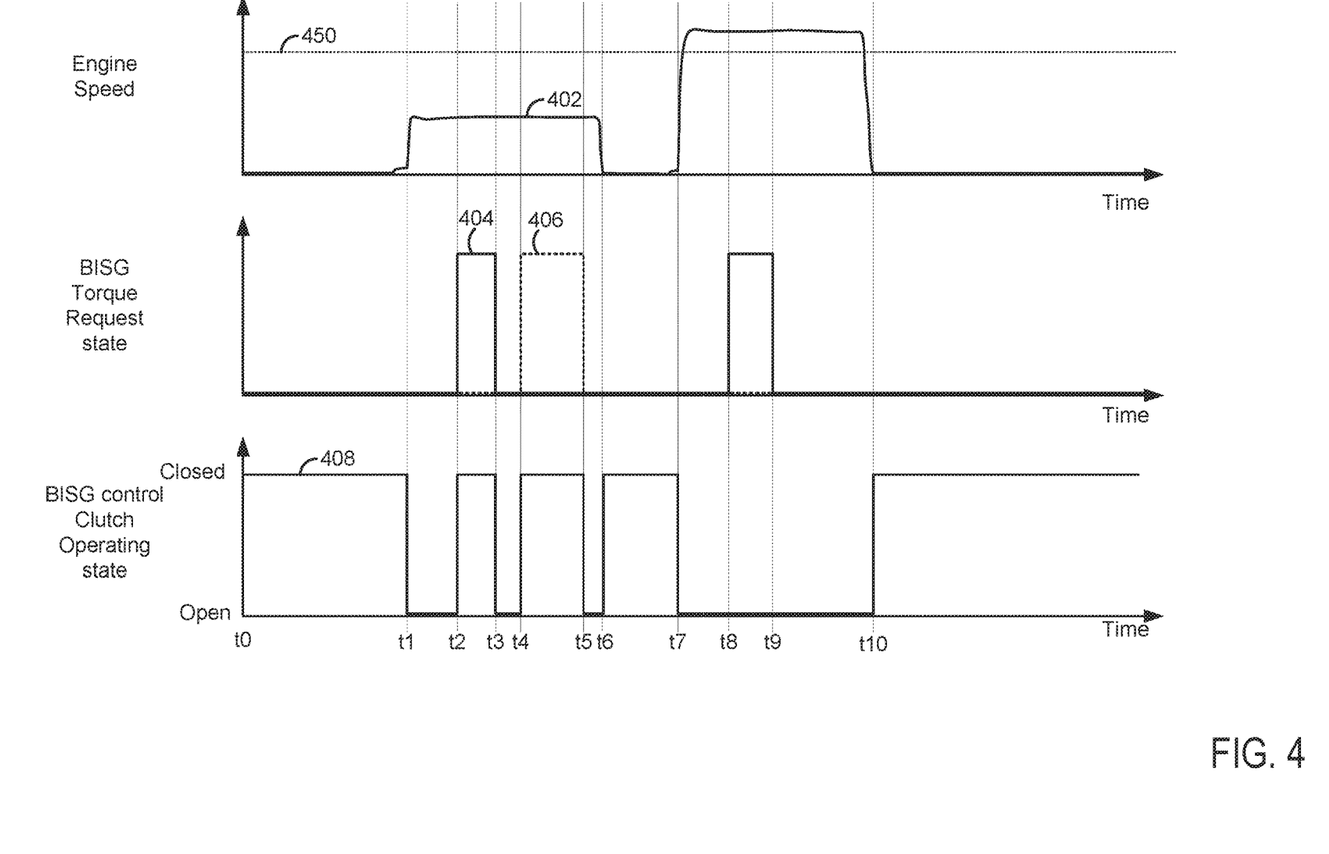
FIG. 4 shows an example BISG operating sequence.
Figure 5:
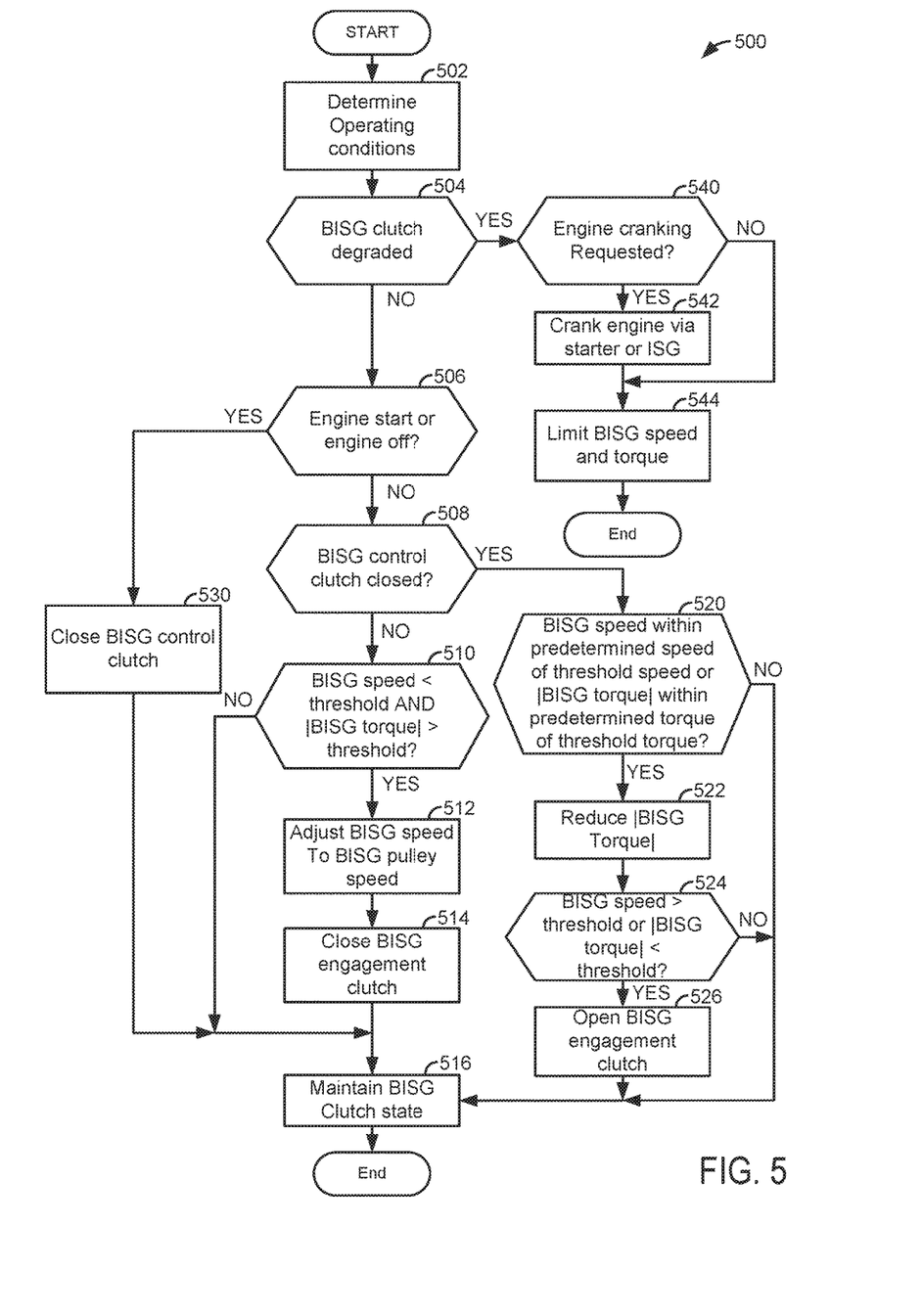
FIG. 5 describes a method for operating an engine that includes a BISG.

The present description is related to operating an engine and a BISG that may be selectively coupled to the engine. The engine may be of the type shown in FIG. 1. The engine and the BISG may be included in a driveline of a hybrid vehicle as is shown in FIG. 2. The BISG may be selectively coupled to the engine via a BISG control clutch. FIGS. 3A and 3B show two different BISG control clutch configurations. An example operating sequence for a BISG clutch is shown in FIG. 4. A method for operating a BISG control clutch is shown in FIG. 5.

Figure 1:
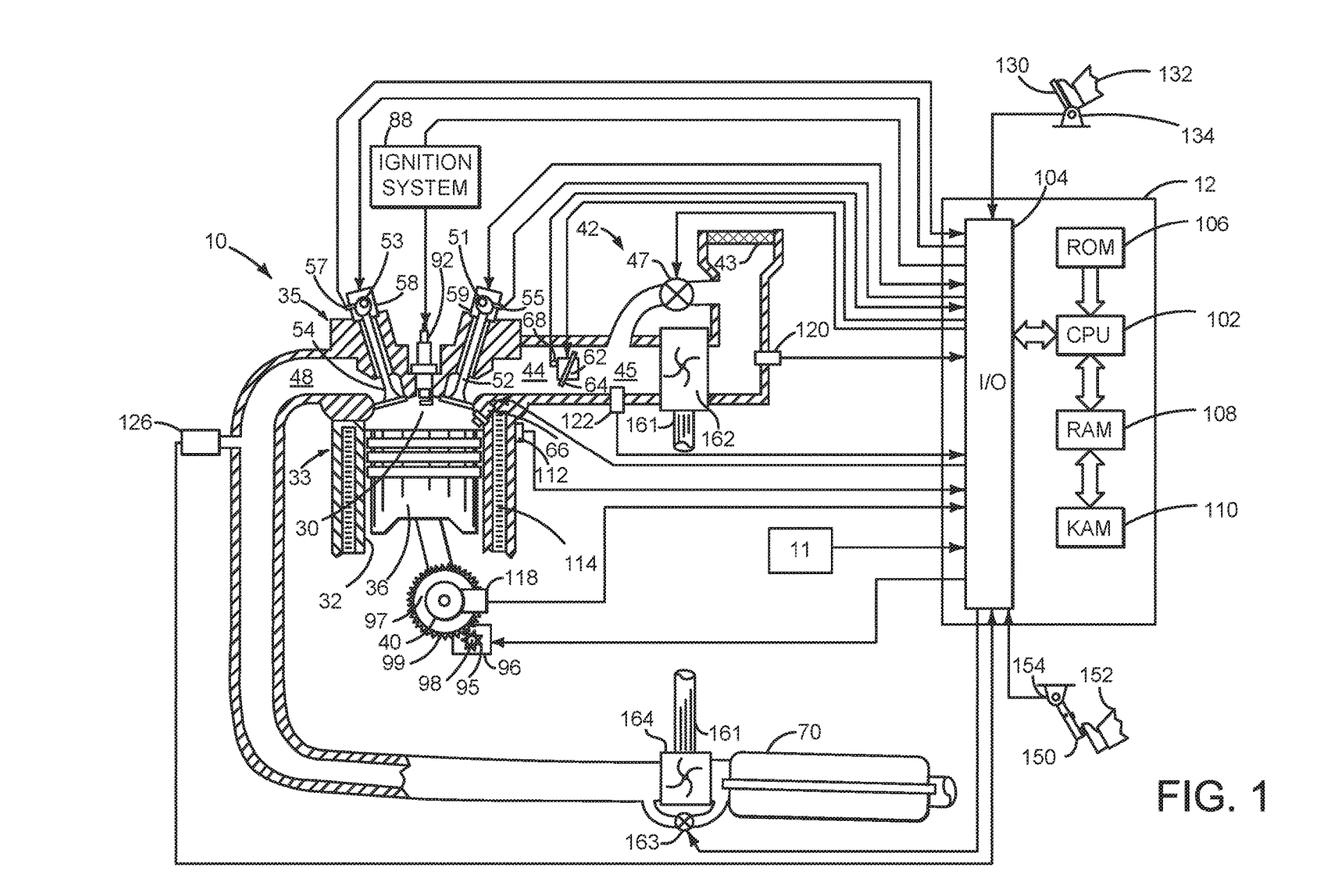
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3B and employs the actuators shown in FIGS. 1-3B to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device.

Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; an integrated starter/generator (ISG) coupled to a crankshaft of the engine via a belt; a clutch configured to selectively couple a shaft of the ISG to a shaft of the engine; and a controller including executable instructions stored in non-transitory memory to close the clutch via the controller in response to output torque or commanded output torque of the ISG not being equal to zero and speed of the ISG being less than a threshold speed. The system further comprises additional instructions to open the clutch via the controller in response to output torque or commanded output torque of the ISG being equal to zero or ISG speed being greater than the threshold speed. The system further comprises additional instructions to reduce output torque of the ISG in response to speed of the ISG being within a predetermined speed of the threshold speed when the clutch is closed. The system further comprises additional instructions to adjust speed of the ISG to a speed of the engine multiplied by a pulley ratio before closing the clutch. The system further comprises additional instructions to limit speed of the engine to less than an ISG rated speed in response to degradation of the clutch. The system further comprises a starter and additional instructions to crank the engine via the starter during starting of the engine in response to degradation of the clutch.

Referring now to FIG. 3A, a sketch of a first example location for a BISG control clutch is shown. In this example, engine 10 is shown with eight cylinders that rotate crankshaft 40. BISG control clutch 302 is directly coupled to crankshaft 40 and engine crankshaft pulley 310. BISG control clutch 302 may be fully opened to decouple crankshaft 40 from engine crankshaft pulley 310. Alternatively, BISG control clutch 302 may fully closed to couple crankshaft 40 to engine crankshaft pulley 310. Engine crankshaft pulley 310 is coupled to BISG pulley 312 via belt 231. BISG pulley 312 is directly coupled to BISG shaft 350. A ratio of the BISG pulley 312 to the engine crankshaft pulley 310 may provide a mechanical advantage to BISG 219 to rotate engine 10. The pulley ratio may also cause BISG 219 to rotate faster than crankshaft 40 when BISG control clutch 302 is fully closed. BISG control clutch 302 may operate according to the method of FIG. 5 in the system of FIGS. 1-3A.

Referring now to FIG. 3B, a sketch of a first example location for a BISG control clutch is shown. In this example, engine 10 is shown with eight cylinders that rotate crankshaft 40. BISG control clutch 304 is directly coupled to BISG shaft 350 and BISG pulley 312. BISG control clutch 304 may be fully opened to decouple BISG shaft 350 from BISG pulley 312.

Alternatively, BISG control clutch 304 may fully closed to couple BISG shaft 350 to BISG pulley 350. Engine crankshaft pulley 310 is coupled to BISG pulley 312 via belt 231. BISG pulley 312 is directly coupled to BISG shaft 350. A ratio of the BISG pulley 310 to the engine crankshaft pulley 312 may provide a mechanical advantage to BISG 219 to rotate engine 10. The ratio may also cause BISG 219 to rotate faster than crankshaft 40 when BISG control clutch 304 is fully closed. BISG control clutch 304 may operate according to the method of FIG. 5 in the system of FIGS. 1-3A.

Referring now to FIG. 4, example plots of a vehicle operating sequence are shown. The operating sequence may be performed via the system of FIGS. 1 and 2 in cooperation with the method of FIG. 5. Vertical lines at times t0-t10 represent times of interest during the sequence. The plots in FIG. 4 are time aligned and occur at the same time.

The first plot from the top of FIG. 4 is a plot of engine speed versus time. The vertical axis represents engine speed and engine speed increases in the direction of the vertical axis arrow. The horizontal axis represents time and time increases from the left side of the figure to the right side of the figure. Solid line 402 represents engine speed. Dashed horizontal line 450 represents a threshold engine speed. The BISG control clutch may not be engaged or closed when engine speed is above threshold 450 so that the rated speed of the BISG is not exceeded. The BISG control clutch may be closed when engine speed is less than threshold 450.

The second plot from the top of FIG. 4 is a plot of BISG torque request state versus time. BISG torque (e.g., positive or negative) is requested and has a magnitude of greater than zero when trace 404 or trace 406 is at a higher level near the vertical axis arrow. BISG torque is not requested and has a magnitude of zero when trace 404 or trace 406 is at a lower level near the horizontal axis. The horizontal axis represents time and time increases from the left side of the figure to the right side of the figure. Solid line 404 represents a negative BISG torque request whereby the BISG charges a battery or electric energy storage device when solid line 404 is at a higher level near the vertical axis arrow. Dashed line 406 represents a positive BISG torque request whereby the BISG provides torque to rotate the driveline when dashed line 406 is at a higher level near the vertical axis arrow. Dashed line 406 follows solid line 404 when only solid line 404 is visible.

The third plot from the top of FIG. 4 is a plot of BISG control clutch operating state versus time. Solid line 408 represents the BISG control clutch operating state and the BISG control clutch is fully closed to transfer torque across the BISG control clutch when line 408 is at a higher level near the vertical axis arrow. The BISG control clutch is fully open and it does not transfer torque when line 408 is at a lower level near the horizontal axis. The horizontal axis represents time and time increases from the left side of the figure to the right side of the figure.

At time t0, the engine is stopped (e.g., not rotating) and BISG torque is not requested. The BISG control clutch is fully closed in preparation for an engine start. Near time t1, an engine start request is made via a human or autonomous driver (not shown) and the engine is rotated at cranking speed via the starter motor or the ISG. In other examples, the engine may be cranked via the BISG.

At time t1, the engine speed begins increasing and the engine is started. The engine is rotating under its own power via combusting air and fuel. The BISG clutch is fully opened shortly after the engine begins to accelerate since BISG torque is not requested and BISG torque is zero.

Between time t1 and time t2, the engine speed levels off to a value that is less than threshold 450 and the BISG torque is zero. Therefore, the BISG clutch is commanded open. By opening the BISG clutch, engine rotating inertia is lowered and BISG bearing wear may be reduced.

At time t2, a request is made for the BISG to charge a battery. The request may be made via a system controller (not shown). The BISG control clutch is closed in response to the request for the BISG to charge the battery. By closing the BISG control clutch, torque may be transferred from the engine or driveline to the BISG so that the BISG may convert the torque into electrical energy to be stored in the battery. The magnitude of torque requested from the BISG is greater than zero (not shown). The engine speed remains below threshold 450.

At time t3, the request for the BISG to charge the battery is withdrawn and the BISG control clutch is fully opened in response to the request for the BISG to charge the battery being withdrawn and the commanded BISG torque being zero. The engine speed remains below threshold 450.

At time t4, a request for the BISG to provide propulsion torque to the driveline is asserted. The request for the BISG to provide propulsion torque may be made in response to a high driver demand torque (not shown). The BISG control clutch is closed in response to the request for the BISG to provide propulsion torque and the BISG output torque magnitude being greater than zero (not shown). By closing the BISG control clutch, torque generated via the BISG may be supplied to the driveline to accelerate the vehicle.

At time t5, the request for the BISG to provide propulsion torque to the driveline is withdrawn and the BISG control clutch is fully opened in response to the request for the BISG to provide propulsion torque being withdrawn and the commanded BISG torque being zero. The engine speed remains below threshold 450.

At time t6, the engine stops rotating and the BISG control clutch is fully closed to prepare for an engine start. The BISG torque request state is not asserted. Near time t7, an engine start request is made via a human or autonomous driver (not shown) and the engine is rotated at cranking speed via the starter motor or the ISG. In other examples, the engine may be cranked via the BISG.

At time t7, the engine speed begins increasing and the engine is started. The engine is rotating under its own power via combusting air and fuel. The BISG clutch is fully opened shortly after the engine begins to accelerate since BISG torque is not requested and BISG torque is zero.

Between time t7 and time t8, the engine speed levels off to a value that is greater than threshold 450 and the BISG output torque is zero. Therefore the BISG clutch is commanded open. By opening the BISG clutch, engine rotating inertia is lowered and BISG bearing wear may be reduced.

At time t8, a request is made for the BISG to charge a battery. However, the BISG control clutch is held fully open since engine speed is greater than threshold 450. By holding the BISG control clutch open, the rated speed (e.g., BISG speed not to be exceeded) of the BISG may not be exceed so that the possibility of BISG degradation may be reduced. In other words, the BISG may free wheel while the engine is rotating at high speed so that BISG degradation may be avoided. Torque is not transferred from the engine to the BISG when the BISG control clutch is fully open. Therefore, the BISG does not charge the battery even though the BISG torque request is asserted. The request for the BISG to charge the battery may be made via a controller in response to state of battery charge (not shown).

At time t9, the request for the BISG to charge the battery is withdrawn. The BISG control clutch remains fully opened and engine speed remains above threshold 450. The request for the BISG to charge the battery may be withdrawn in response to vehicle operating conditions, such as battery state of charge and road grade. The engine speed remains above threshold 450.

At time t10, engine speed is reduced to zero. The BISG control clutch is fully closed in response to the engine speed being zero. The BISG torque request is not asserted.

In this way, a BISG control clutch may be selectively fully opened and fully closed in response to vehicle operating conditions. Opening the BISG control clutch may reduce the possibility of BISG degradation.

Referring now to FIG. 5, a flow chart of a method for operating a hybrid vehicle driveline is shown. The method of FIG. 5 may be incorporated into and may cooperate with the system of FIGS. 1-3B. Further, at least portions of the method of FIG. 5 may be incorporated as executable instructions stored in non-transitory memory while other portions of the method may be performed via a controller transforming operating states of devices and actuators in the physical world.

At 502, method 500 determines operation conditions. Operating conditions may include but are not limited to engine speed, BISG torque, ISG torque, driver demand torque, presence or absence of BISG control clutch degradation, engine load, ambient temperature, ambient pressure, vehicle speed, and BISG speed. Method 500 proceeds to 504.

At 504, method 500 judges if BISG control clutch degradation is present. In one example, method 500 may judge that the BISG control clutch is degraded if the BISG control clutch is commanded open and BISG speed is equal to engine speed multiplied by the ratio of pulleys between the engine crankshaft and the BISG shaft. Further, method 500 may judge that the BISG control clutch is degraded if the BISG control clutch is commanded closed and BISG speed is not equal to engine speed multiplied by the ratio of pulleys between the engine crankshaft and the BISG shaft. If method 500 judges that BISG control clutch degradation is present, the answer is yes and method 500 proceeds to 540. Otherwise, the answer is no and method 500 proceeds to 506.

At 540, method 500 judges if engine cranking and starting are requested. An engine cranking and start request may be made responsive to vehicle operating conditions or via an input provided by a human driver to a human/machine interface. If method 500 judges that engine cranking and starting are requested, the answer is yes and method 500 proceeds to 542. Otherwise, the answer is no and method 500 proceeds to 544.

At 542, method 500 cranks the engine via the starter (e.g., 96 of FIG. 1) or the ISG (e.g., 240 of FIG. 2). The engine is cranked by rotating the engine under power provided via an electric machine so that combustion may be initiated in the engine. Further, method 500 provides fuel and spark to the engine so that the engine may begin combusting fuel and rotating under its own power. Thus, the engine may be started via an electric machine other than the BISG when the BISG control clutch is degraded. Method 500 proceeds to 544 after the engine is started.

At 544, method 500 limits or prevents BISG speed from exceeding a threshold speed. Further, method 500 may limit or prevent a magnitude of BISG requested torque from exceeding a threshold amount of torque. For example, method 500 may prevent engine speed from exceeding a threshold speed (e.g., 7500 RPM) when BISG control clutch degradation is present to reduce the possibility of the BISG from exceeding a rated BISG speed. In one example, engine speed is limited via limiting an opening amount of the engine throttle. Further, the amount of fuel injected to the engine may be prevented from exceeding a threshold amount to limit engine speed to less than a threshold speed. Thus, if the BISG control clutch cannot be opened, speed of the BISG will not exceed a rated BISG speed since engine speed is limited and the BISG is couple to the engine via the belt. On the other hand, if the BISG control clutch cannot be closed, the BISG requested torque may be prevented from exceeding the threshold amount of torque so that the BISG does not accelerate and/or discharge the battery unnecessarily. By limiting the requested BISG torque, the actual amount of torque generated by the BISG may be limited. Method 500 proceeds to exit.

At 506, method 500 judges if an engine start is requested or if the engine is off (e.g., not combusting fuel and not rotating). In one example, method 500 may judge that the engine is off and not combusting fuel if engine speed is zero and fuel is not being injected to the engine (e.g., the fuel injectors are commanded off). Method 500 may judge that an engine start is requested if a human provides input to a human/machine interface. If method 500 judges that an engine start is requested or that the engine is off, the answer is yes and method 500 proceeds to 530. Otherwise, the answer is no and method 500 proceeds to 508.

At 530, method 500 fully closes the BISG control clutch. The BISG control clutch is closed to allow the BISG to crank and rotate the engine for an engine start. Method 500 proceeds to 516 after the BISG control clutch is closed.

At 516, method 500 maintains the present state of the BISG control clutch. Thus, if the BISG control clutch is closed, the BISG control clutch remains closed. If the BISG control clutch is open, the BISG control clutch remains open. Method 500 proceeds to exit.

At 508, method 500 judges if the BISG control clutch is closed. In one example, the operating state of the BISG control clutch is indicated by a value of a variable in controller memory. For example, if the BISG control clutch is fully closed, the value of the variable is one. If the BISG control clutch is open, the value of the variable is zero. If method 500 judges that the BISG control clutch is fully closed, the answer is yes and method 500 proceeds to 520. Otherwise, the answer is no and method 500 proceeds to 510.

At 510, method 500 judges if a rotational speed of the BISG is less than a threshold speed (e.g., a rated or maximum speed of rotation of the BISG that is not to be exceeded by the BISG) and if the absolute value of requested output torque of the BISG or commanded BISG torque is greater than a threshold torque (e.g., a maximum torque having a value of zero torque, or alternatively, another torque value that is less than 10 Newton-meters). The BISG speed may be determined via a speed sensor or via multiplying engine speed by the pulley ratio that is between the engine and the BISG. Method 500 checks the present BISG speed against the threshold speed to ensure that BISG speed does not exceed the rated speed of the BISG before engaging or closing the BISG control clutch to avoid over-speed of the BISG. Further, method 500 checks to see if the requested BISG or the commanded BISG torque is greater than the magnitude of a threshold torque to ensure that the BISG control clutch remains open unless BISG torque (positive or negative) is desired. If method 500 judges that a rotational speed of the BISG is less than a threshold speed and if the absolute value of requested output torque of the BISG is greater than a threshold torque, then the answer is yes and method 500 proceeds to 512. Otherwise, the answer is no and method 500 proceeds to 516.

At 512, method 500 adjusts a rotational speed of the BISG's shaft to a rotational speed of the BISG pulley (e.g., engine speed multiplied by the pulley ratio between the engine crankshaft and the BISG shaft). Method 500 may operate the BISG in a motor mode to match BISG shaft speed to a speed of the BISG pulley. The speed of the BISG may be increased via increasing an amount of electrical current that is flowing to the BISG. The speed of the BISG may be decreased via decreasing an amount of electrical current that is flowing to the BISG. By adjusting the shaft speed of the BISG to the speed of the BISG pulley, the BISG control clutch may be closed without creating a large torque disturbance of the engine and/or driveline. Method 500 proceeds to 514.

At 514, method 500 fully closes the BISG control clutch. The BISG control clutch may be commanded closed electrically or hydraulically. By fully closing the BISG control clutch, torque may be transferred from the engine to the BISG and vise-versa. Method 500 proceeds to 516.

At 520, method 500 judges if a rotational speed of the BISG is within a predetermined speed of a threshold speed. Further, method 500 judges if requested BISG output torque is within a predetermined torque of a threshold torque. If either condition is true, the answer is yes and method 500 proceeds to 522. Otherwise, the answer is no and method 500 proceeds to 516.

At 522, method 500 reduces the absolute value of the output torque of the BISG. The absolute value of the output torque of the BISG is reduced so that a large change in driveline torque does not occur when the BISG control clutch is disengaged. In this way, driveline torque disturbances may be reduced. Method 500 proceeds to 524.

At 524, method 500 judges if rotational speed of the BISG is greater than a threshold. In one example, the threshold speed is a rated speed of the BISG (e.g., a speed of the BISG that is not to be exceeded (20,000 RPM)). Further, method 500 judges if an absolute value of requested output torque or a commanded output torque of the BISG exceeds a threshold (e.g., zero, or alternatively, some torque less than 10 Newton-meters). The BISG speed may be determined via a speed sensor and requested BISG output torque may be determined from a value stored in controller volatile memory. If method 500 judges that the rotational speed of the BISG is greater than a threshold or that the absolute value of requested BISG output torque is greater than a threshold amount of torque, the answer is yes and method 500 proceeds to 526. Otherwise, the answer is no and method 500 proceeds to 516.

At 526, method 500 fully opens the BISG control clutch. The BISG control clutch may be fully opened electrically or hydraulically via the controller. Opening the BISG control clutch allows engine speed to increase without the BISG rotational speed exceeding a rated speed of the BISG. Further, when BISG output torque is low, the BISG control clutch may be opened to reduce BISG bearing degradation and lower engine inertia to conserve fuel. Method 500 proceeds to 516.

In this way, the BISG control clutch may be selectively opened and closed to improve driveline performance and efficiency. Further, the possibility of BISG degradation may be reduced.

Thus, the method of FIG. 5 provides for a powertrain operating method, comprising: determining that a torque of a belt integrated starter/generator (BISG) is not zero and BISG speed is less than a threshold speed via a controller; closing a BISG control clutch in response to the BISG torque not being equal to zero and BISG speed less than the threshold speed via the controller; determining that a torque of the BISG is zero via the controller; determining that BISG speed is greater than a threshold speed via a controller; and opening the BISG control clutch in response to the BISG torque being equal to zero or BISG speed being greater than the threshold speed via the controller. The method includes where the BISG control clutch is positioned between an engine crankshaft and an engine pulley. The method includes where the BISG control clutch is positioned between a BISG shaft and a BISG pulley. The method further comprises determining that the BISG speed is greater than the threshold speed via multiplying engine speed by a pulley ratio. The method further comprises closing the BISG control clutch during starting of an engine. The method includes where the torque of the BISG is zero when battery charging via the BISG is not requested and when propulsion torque is not provided via the BISG. The method includes where the torque of the BISG is not zero when the BISG is charging a battery or when the BISG is providing a propulsion torque. The method further comprises charging a battery via the BISG when the torque of the BISG is not zero.

The method of FIG. 5 also provides for a powertrain operating method, comprising: determining that a torque of a belt integrated starter/generator (BISG) is not zero and BISG speed is less than a threshold speed via a controller; closing a BISG control clutch in response to the BISG torque not being equal to zero and BISG speed less than the threshold speed via the controller; determining that a torque of the BISG is zero via the controller; determining that BISG speed is greater than a threshold speed via a controller; opening the BISG control clutch in response to the BISG torque being equal to zero or BISG speed being greater than the threshold speed via the controller; determining BISG control clutch degradation via the controller; and preventing engine speed from exceeding the threshold speed via the controller in response to degradation of the BISG control clutch. The method includes where preventing engine speed from exceeding the threshold speed includes adjusting engine air flow via a throttle. The method includes where preventing engine speed from exceeding the threshold speed includes adjusting engine fuel flow via a fuel injector. The method further comprises cranking an engine via the BISG when the BISG control clutch is not degraded. The method further comprises cranking the engine via a starter motor other than the BISG when the BISG control clutch is degraded. The method further comprises decreasing output torque of the BISG in response to speed of the BISG being within a predetermined speed of the threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
    closing a belt integrated starter/generator control clutch via a controller in response to a torque of a belt integrated starter/generator not being equal to zero and a belt integrated starter/generator speed being less than a threshold speed; and
    opening the belt integrated starter/generator control clutch via the controller in response to the torque of the belt integrated starter/generator being equal to zero or the belt integrated starter/generator speed being greater than the threshold speed.

2. The method of claim 1, where the belt integrated starter/generator control clutch is positioned between an engine crankshaft and an engine pulley.

3. The method of claim 1, where the belt integrated starter/generator control clutch is positioned between a belt integrated starter/generator shaft and a belt integrated starter/generator pulley.

4. The method of claim 1, further comprising determining that the belt integrated starter/generator speed is greater than the threshold speed via multiplying engine speed by a pulley ratio.

5. The method of claim 1, further comprising closing the belt integrated starter/generator control clutch during starting of an engine.

6. The method of claim 1, where the torque of the belt integrated starter/generator is zero when battery charging via the belt integrated starter/generator is not requested and when propulsion torque is not provided via the belt integrated starter/generator.

7. The method of claim 1, where the torque of the belt integrated starter/generator is not zero when the belt integrated starter/generator is charging a battery or when the belt integrated starter/generator is providing a propulsion torque.

8. The method of claim 1, further comprising charging a battery via the belt integrated starter/generator when the torque of the belt integrated starter/generator is not zero.

9. A powertrain operating method, comprising:
    closing a belt integrated starter/generator control clutch via a controller in response to a torque of a belt integrated starter/generator not being equal to zero and a belt integrated starter/generator speed being less than a threshold speed;
    opening the belt integrated starter/generator control clutch via the controller in response to the torque of the belt integrated starter/generator being equal to zero or the belt integrated starter/generator speed being greater than the threshold speed; and
    preventing engine speed from exceeding the threshold speed via the controller in response to degradation of the belt integrated starter/generator control clutch.

10. The method of claim 9, where preventing engine speed from exceeding the threshold speed includes adjusting engine air flow via a throttle.

11. The method of claim 9, where preventing engine speed from exceeding the threshold speed includes adjusting engine fuel flow via a fuel injector.

12. The method of claim 9, further comprising cranking an engine via the belt integrated starter/generator when the belt integrated starter/generator control clutch is not degraded.

13. The method of claim 12, further comprising cranking the engine via a starter motor other than the belt integrated starter/generator when the belt integrated starter/generator control clutch is degraded.

14. The method of claim 9, further comprising decreasing output torque of the belt integrated starter/generator in response to speed of the belt integrated starter/generator being within a predetermined speed of the threshold speed.

15. A system, comprising:
    an engine;
    a belt integrated starter/generator coupled to the engine via a belt;
    a clutch configured to selectively couple a shaft of the belt integrated starter/generator to a shaft of the engine; and
    a controller including executable instructions stored in non-transitory memory to close the clutch via the controller in response to output torque of the belt integrated starter/generator not being equal to zero and speed of the belt integrated starter/generator being less than a threshold speed.

16. The system of claim 15, further comprising additional instructions to open the clutch via the controller in response to output torque of the belt integrated starter/generator being equal to zero or belt integrated starter/generator speed being greater than the threshold speed.

17. The system of claim 15, further comprising additional instructions to reduce output torque of the belt integrated starter/generator in response to speed of the belt integrated starter/generator being within a predetermined speed of the threshold speed when the clutch is closed.

18. The system of claim 15, further comprising additional instructions to adjust speed of the belt integrated starter/generator to a speed of the engine multiplied by a pulley ratio before closing the clutch.

19. The system of claim 15, further comprising additional instructions to limit speed of the engine to less than a belt integrated starter/generator rated speed in response to degradation of the clutch.

20. The system of claim 15, further comprising a starter and additional instructions to crank the engine via the starter during starting of the engine in response to degradation of the clutch.

* * * * *